March 5, 1963 H. L. BOWDITCH ETAL 3,080,561
STRIP CHART RECORDING APPARATUS
Filed Sept. 15, 1958 2 Sheets-Sheet 1
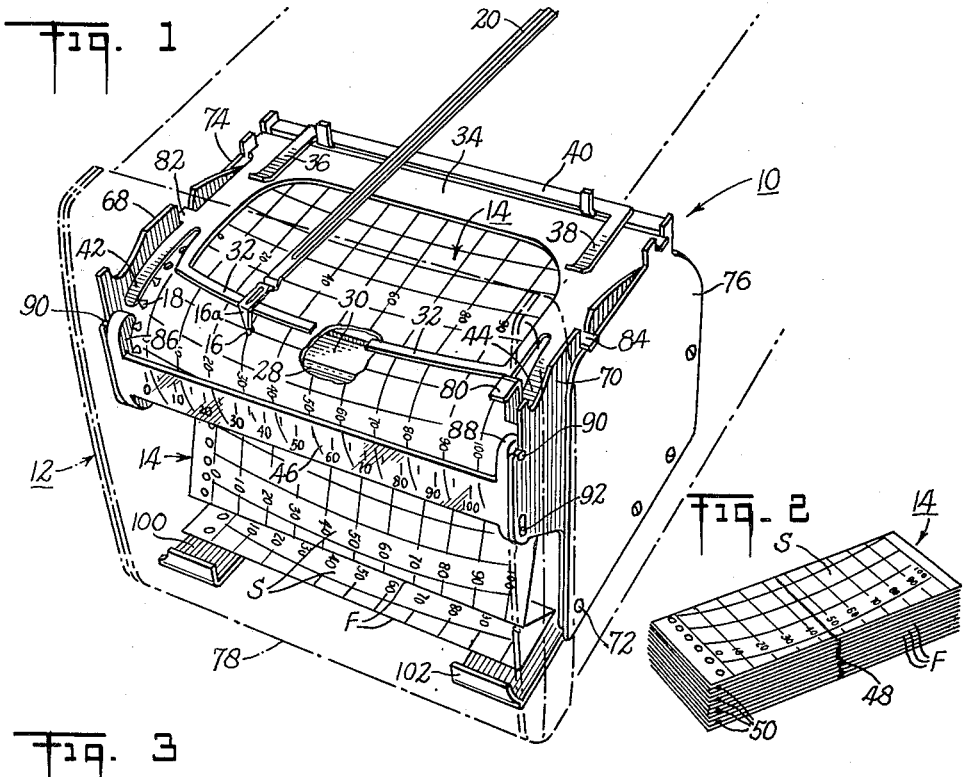
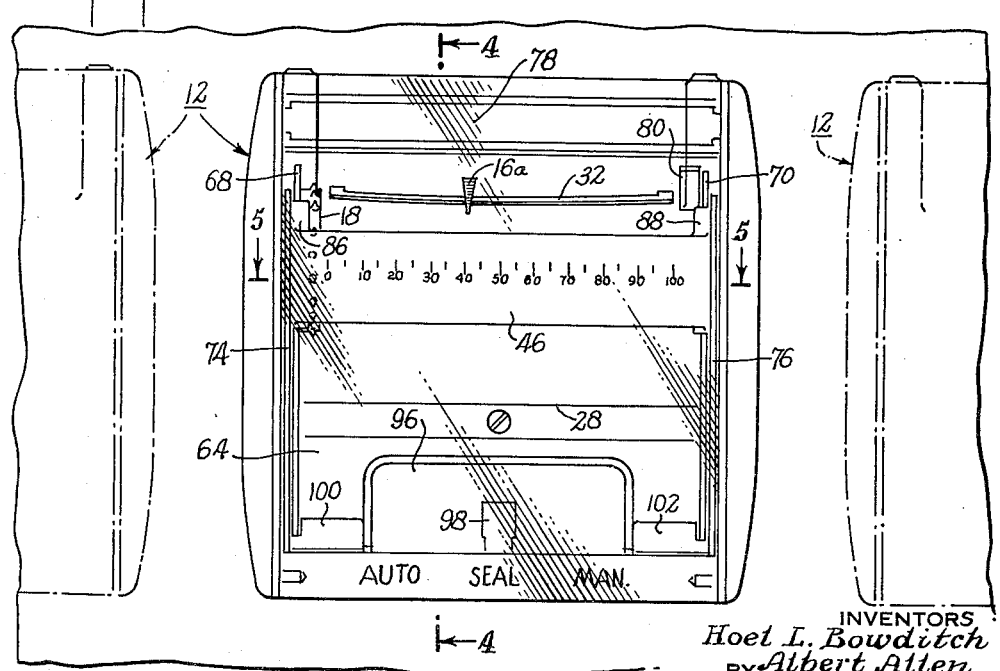
INVENTORS
Hoel L. Bowditch
BY Albert Allen
Curtis Morris + Safford
ATTORNEYS

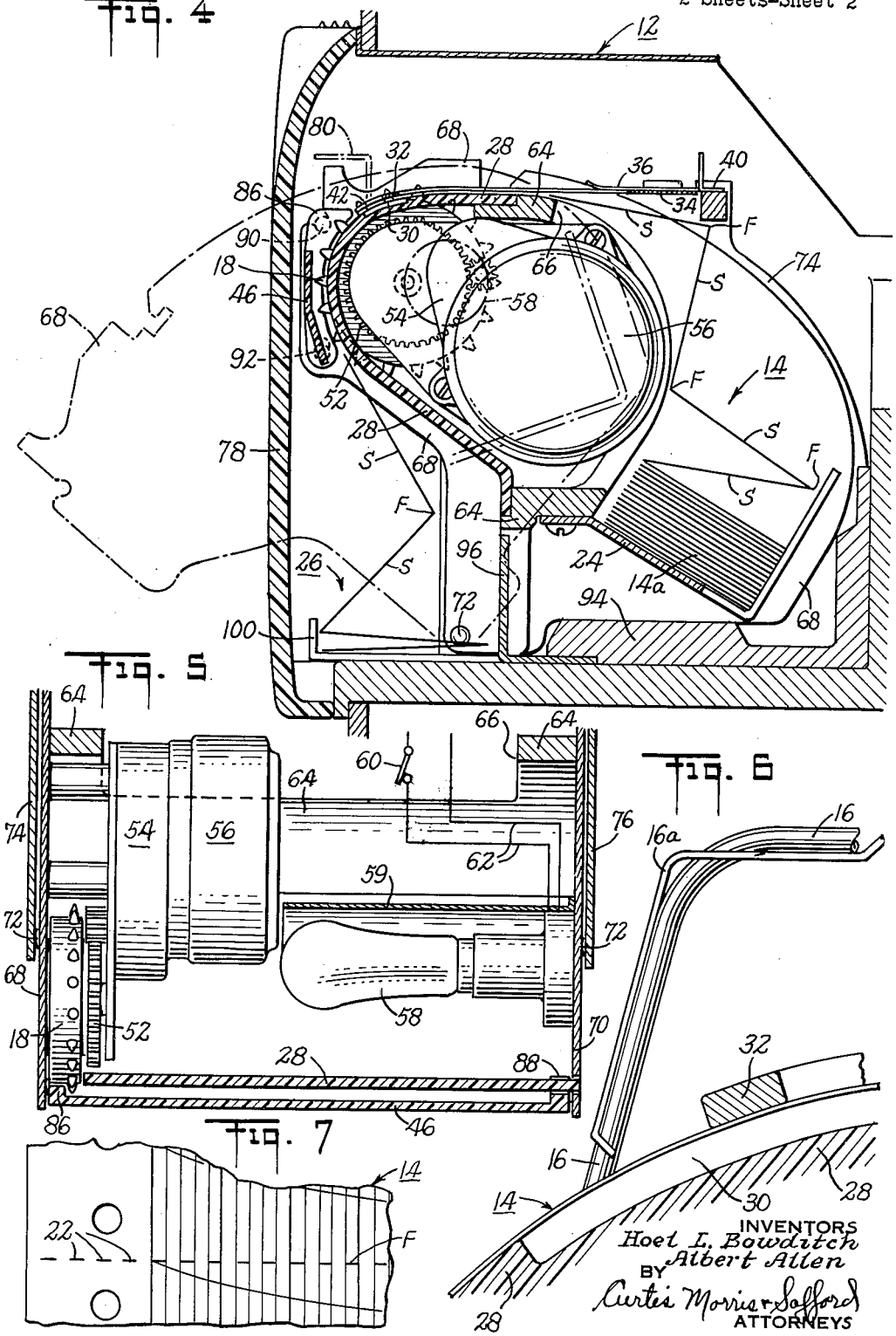

United States Patent Office 3,080,561
Patented Mar. 5, 1963

3,080,561
STRIP CHART RECORDING APPARATUS
Hoel L. Bowditch, Foxboro, and Albert Allen, Sharon, Mass., assignors to The Foxboro Company, Foxboro, Mass.
Filed Sept. 15, 1958, Ser. No. 761,064
7 Claims. (Cl. 346—116)

This invention relates to improvements in strip chart recorders and charts for use therewith.

In many prior strip chart recorders (see for example U.S. Patent 2,671,710), the blank strip is drawn out from a chart supply roll located towards the rear of the instrument, and is fed over and around a rotatable roller in the upper front part of the instrument, the roller serving as a platen to support the chart beneath a transversely movable recording pen. From this roller the strip is pulled vertically down across the front of the instrument case, the traced record being visible through a transparent front cover, and at the bottom the completed chart is wound on a take-up spool. Such strip chart recorders are superior to earlier circular chart recorders because they have a smaller frontal area and thus are more adaptable for panel mounting, and also because strip charts can provide considerable more recording time than circular charts.

When the completed strip chart record has been wound on the take-up spool, it is removed and typically stored in roll form for future reference. However, one of the difficulties with such an arrangement is that, to subsequently inspect any particular point in the record, it is necessary to unroll the chart. This frequently takes considerable time particularly if the point of interest is remote from the ends of the strip. Moreover, it is bothersome to spread out such a chart for study purposes since it tends to curl back into its normally rolled form.

Another disadvantage of such prior arrangements is that power must be supplied not only to the roller at the top of the case, but also to the take-up spool at the bottom. Furthermore, in order to eliminate any slack in the vertically-extending portion of the strip, the take-up spool normally is rotated slightly faster than the upper roller by means of a slipping friction drive, and this requires substantial additional power. Also, the various chart drive elements including the roller and take-up spool occupy space which, if these elements were eliminated, could with advantage be used for other devices to improve the utility of the recorder.

In an embodiment of the present invention to be described hereinbelow in more detail, a recording instrument is arranged for use with a strip chart of the "accordion-pleated" type, i.e. wherein the strip is folded in opposite directions along transverse fold lines evenly spaced along its length. The supply of blank strip chart is placed in the instrument in a compact folded stack, and during a recording operation the strip is drawn from the top of this stack and fed down across the front of the instrument to a storage region where it automatically stacks up again in folded form. It will be apparent that, after the completed chart stack has been removed from the instrument, it can be read as easily as a book in that the chart can be opened quickly to any "page" which it is desired to inspect. Moreover, several "pages" of the chart can readily be spread out on a table for detailed study purposes.

Attempts have been made heretofore to use folded strips for chart records, but these attempts have not produced satisfactory results. For example, one of the problems encountered with prior constructions is that the ink from the recording pen tended to flow heavily onto the fold lines, where the paper fibers are torn and exposed, and smeared the chart record to such an extent that it was impossible to obtain an accurate reading near the fold lines. Also, the strip chart recorders proposed heretofore have suffered from undue complexity and have not provided certain features that are particularly desirable in industrial instrumentation of this type.

Accordingly, it is an object of this invention to provide strip chart recording apparatus that is superior to such apparatus provided heretofore. It is a further object of this invention to provide an improved recording instrument particularly adapted for use with strip chart records of the "accordion pleated" type. It is a still further object to provide an improved strip chart record. Other objects, advantages and aspects of the present invention will be in part apparent from, and in part pointed out in, the following description of a preferred embodiment of the invention considered together with the accompanying drawings, in which:

FIGURE 1 is a perspective view of a strip chart recording instrument constructed in accordance with the present invention;

FIGURE 2 shows a stack of folded strip chart record of the type used in the instrument of FIGURE 1;

FIGURE 3 is a front elevation of the instrument of FIGURE 1 shown mounted in a panel along with other similar instruments;

FIGURE 4 is a cross-section taken along line 4—4 of FIGURE 3;

FIGURE 5 is a horizontal section taken along line 5—5 of FIGURE 3;

FIGURE 6 is a detail cross-section showing the pen engaged with the strip chart; and FIGURE 7 is a detail plan view of the strip chart particularly showing the perforations along the fold line.

Referring now to FIGURE 1, the chart drive unit 10 of the recording instrument is shown mounted in an instrument case indicated in phantom outline at 12. The strip chart record 14 extends horizontally along the top of the chart drive unit 10, and is drawn towards the front and beneath a recording pen 16 by a sprocket wheel 18 (see also FIGURE 3) the teeth of which engage corresponding sprocket holes in the side edge of the chart. The pen 16 is carried on the end of a pen arm 20 which is pivoted at its remote end (by the usual means not shown herein) to permit the pen to be shifted transversely across the surface of the strip chart to trace measurement data thereon.

As particularly shown in FIGURE 4, the strip chart 14 consists of a series of contiguous sheets "S" defined by transverse fold lines "F" at evenly spaced intervals, the fold lines being formed by cut perforations 22 (FIGURE 7). A stack 14a of folded strip chart is held in a supply basket 24 towards the rear of the chart drive unit 10, and the strip is drawn smoothly at constant speed from this basket by rotation of the sprocket wheel 18. After the chart has moved around the sprocket wheel, it drops down and automatically refolds into its original stack form in a storage region generally indicated at 26.

When the recording pen 16 (FIGURE 1) comes into contact with one of the transverse fold lines "F" of the strip chart 14, there is a tendency for more ink than normal to be drawn out of the pen. If the strip chart were positioned about a conventional platen as in the prior roller feed arrangements, the ink would smear to such an extent that the chart could not accurately be read.

In accordance with the present invention, however, ink smearing at the fold lines is effectively eliminated by a unique arrangement comprising a fixed platen 28 (FIGURE 4) which supports the full width of the strip. This fixed platen is bowed out towards the front of the instrument to present a curved contour which follows the periphery of the sprocket wheel for about one-third of its circumference. Moreover, the platen 28 is formed with a shallow transverse groove 30 (see also FIGURE 6) which extends across the full width of the platen in the region traversed by the pen 16.

Apparently the ink smearing in prior arrangements was due primarily to capillary action which drew the ink out into the small space between the paper and the smooth, uninterrupted support platen. In the present construction, the strip chart is drawn tautly over the groove 30 and thus held away from the bottom thereof, so that capillary action is effectively eliminated and smearing prevented. The chart is held in this position by the teeth of the sprocket wheel 18 and by resilient hold-down means including a curved bar 32 which flexibly engages the surface of the chart above the groove. This curved bar forms part of a top plate 34 (FIGURE 1) which is urged downwardly by a pair of spring fingers 36, 38 extending forwardly from a cross piece 40. The top plate also includes a pair of forwardly-extending guide fingers 42, 44 which are curved downwardly to engage the side edges of the strip chart. Extending across the front of the instrument is a plastic scale 46, marked with suitable indicia to aid in reading the data traced on the chart 14.

With the strip chart 14 held tautly away from the bottom of the groove 30, the measurement data traced by the pen will not be smeared, and the trace can be read as accurately on a fold line "F" as in the center of a sheet "S" between the fold lines. In actual practice, there will be slightly more ink flow when the pen comes into contact with one of the fold lines, apparently due to the draw of the exposed cut fibers of the paper. However, this is an advantage because the slightly heavier markings on the fold lines form, when the completed record stack is viewed from its side as in FIGURE 2, a clear trace line 48 which provides a summary picture of the measurement variations that have taken place over a relatively long period of time.

In accordance with a further aspect of the invention, the blank strip chart is provided with marks on selected fold lines as indicated at 50 in FIGURE 2. For example a mark may be placed on every sixth fold line, the time duration represented by the length of chart between the marked fold lines being perhaps 6 hours. Thus, when the completed strip chart stack is being studied, the marks may be used as an index to aid in quickly determining the location of a particular time or times on the chart.

Referring now to FIGURE 3, the sprocket wheel 18 is driven by a gear 52 through a friction clutch arrangement (not shown herein) which permits the sprocket wheel to be rotated by hand to shift the strip chart 14 if desired. The gear 52 is, in turn, driven through a gear box 54 by a synchronous electric drive motor 56. To the right of the drive motor is mounted a light bulb 58 with a shield 59 to provide illumination for the strip chart 14, the light passing through the platen 28 which is formed of transparent plastic material for this purpose. Provision of this light bulb is made possible by the unique fixed platen and sprocket wheel drive arrangement described above.

A further advantage obtained by this arrangement is that signal lights of various types may be placed behind the fixed platen 28 to shine through the strip chart 14. For example, it often is desired to provide an alarm signal to be activated whenever the measured condition deviates more than a certain amount from a set value. For this purpose, an interruptor switch diagrammatically indicated at 60 may be inserted in series with the electric circuit 62 which energizes the bulb 58, and operated by conventional means (not shown) to cause the bulb to "blink" and thus serve as an alarm signal when the measured condition has deviated too far. Or a separate light bulb (not shown), e.g. a red light, may be mounted alongside bulb 58 to produce a characteristic signal when a predetermined condition occurs.

Referring also to FIGURES 3 and 4, the platen 28 is bolted at top and bottom to a frame member 64 which in cross-section appears somewhat in the shape of a "question-mark." The rear wall of this frame member is cut out at 66 to form a rectangular opening which provides access to the parts mounted in the space between the platen and the frame member. The chart supply basket 24 is bolted to the underside of the frame member 64.

The frame member 64 is secured to a pair of movable side plates 68, 70 (see also FIGURE 1) which are pivotally mounted at 72 to a corresponding pair of fixed side plates 74, 76. To refill the chart supply basket 24, the transparent front door 78 of the instrument is opened and the top plate 34 is lifed up by means of a finger tab 80. This top plate carries on its side edges a pair of tongues 82, 84 which normally rest in corresponding open slots in plates 68, 70 to prevent these plates from rotating about their pivot 72. However, when the top plate 34 is lifted up, these tongues are shifted out of their slots so that side plates 68, 70, along with fixed platen 28 and frame member 64, can be rotated forwardly to permit access to the chart supply basket for reloading purposes. At the same time, the curved bar 32 and guide fingers 42, 44 are moved up out of contact with the platen and the pen 16 is lifted up to allow a new strip chart to be inserted in position under the pen.

Also to facilitate insertion of a new strip chart, the plastic scale 46 is mounted in such a manner that it can quickly be moved out and away from the platen 28. For this purpose, scale 46 is secured at its ends to mounting brackets 86, 88 which are respectively fastened to the movable side plates 68, 70 by upper and lower pins 90, 92 (only one set of which is shown in FIGURE 1). The lower pins 92 are held captive in closed vertical slots, and the upper pins 90 are seated in vertical slots open at the top. To release the scale 46 from its normal position, the scale is shifted upwardly until the lower pins 92 reach the ends of their slots. Then the scale is rotated counterclockwise about the lower pins as pivots, the upper pins 90 being clear of their slots in the side plates 68, 70.

The fixed side plates 74, 76 are bolted to a base member 94 (FIGURE 4) the front edge of which carries an L-shaped separator plate 96 (see also FIGURE 3). This plate remains fixed in position when the platen 28 is swung forwardly as described above, and serves to prevent the folded chart stack in storage area 26 from slipping back underneath the frame member 64. In front of this separator plate, the instrument case 12 is provided with the usual lever 98 which is movable into any one of several positions ("auto.-seal-man.") to select the mode of operation of a process controller when used with the recording instrument. A pair of flanged feet 100, 102 also are provided in this region to define the limits of the storage area 26 in which the completed record chart is folded up in stack form.

Referring to FIGURE 6, the pen 16 consists of a simple capillary tube the end of which is in contact with chart 14. This end is cut off at an angle to match the surface of the chart which, following the contour of the fixed platen 28, curves down and forwardly in the region of contact with the pen. A triangular target 16a is secured to the capillary pen tube to permit the pen position to be readily determined by observation from the front of the instrument.

Although a preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:

1. A strip-chart recording instrument comprising, in combination, a platen mounted in the upper front region of said instrument, a strip chart record drawn over said platen, said strip chart record having transverse fold lines, drive means for advancing said chart record past said platen, a pen mounted for transverse movement across said platen to place ink traces on said chart record, said platen being formed with a transverse groove to minimize the spreading of ink when one of said fold lines passes under said pen, said platen being constructed and arranged in such a manner that said groove is beneath said pen when any one of said fold lines is beneath said pen, and hold-down means pressed against the outer surface of said chart record adjacent said platen groove to hold said record tautly in position over said groove.

2. A recording instrument as claimed in claim 1, wherein said platen is fixed relative to said instrument, said hold-down means including a thin plate member having a narrow band extending transversely across said platen in contact with said record chart along one edge of said transverse groove.

3. A recording instrument as claimed in claim 2, wherein said plate member is mounted for vertical movement, said band being positioned beneath said pen whereby when said plate member is moved up it simultaneously shifts said pen out of contact with the record chart and releases the hold-down pressure on said record chart, so that the record chart may be removed or a fresh record chart inserted.

4. A recording instrument as claimed in claim 3, wherein said plate member includes a pair of spring arms extending forwardly along both side edges of said platen and resiliently pressing the side edge portions of said record chart into position around said platen.

5. In a recording instrument of the type adapted to produce a permanent record of the value of a process condition such as temperature, pressure and the like, the combination of a fixed platen in the upper front portion of said recording instrument, a strip chart record having a plurality of transverse fold lines lying against said fixed platen, drive means for advancing said strip chart record in a forward direction over said platen and down across the front thereof; a pen comprising means to dispense liquid ink mounted over said fixed platen and arranged to move transversely thereacross in contact with said strip chart record to apply an ink trace thereto, said fixed platen being provided with a transverse groove located directly beneath the path of movement of said pen to minimize the spreading of ink when a fold line of said record comes into contact with said pen.

6. Apparatus as claimed in claim 5, wherein the lower front portion of said fixed platen extends in a rearwardly direction and comprises means to define a chart storage chamber immediately beneath said fixed platen, said chamber being adapted to receive said strip chart in folded condition, and means adjacent the upper front portion of said platen to guide said chart record down across the front of said platen and directly into said chart storage chamber.

7. A strip chart recording instrument comprising platen means, a strip chart record having transverse fold lines positioned for movement past said platen means, a pen mounted for transverse movement across said chart record to place liquid indicia markings thereon, said platen means being provided with transverse groove means constructed and arranged in such a manner that said groove means is beneath said pen when any of said fold lines is beneath said pen, thereby to minimize the spreading of ink when said fold lines pass beneath said pen.

References Cited in the file of this patent

UNITED STATES PATENTS

| 689,529 | Wolfe | Dec. 24, 1901 |
| 1,235,334 | Landis | July 31, 1917 |
| 1,910,361 | Pick | May 23, 1933 |
| 2,269,240 | Anderson | Jan. 6, 1942 |
| 2,341,118 | Rodanet | Feb. 8, 1944 |
| 2,446,400 | Woolley | Aug. 3, 1948 |
| 2,718,448 | Powers | Sept. 20, 1955 |
| 2,783,120 | Zabriskie | Feb. 26, 1957 |
| 2,879,128 | Albright | Mar. 24, 1959 |
| 2,882,118 | Fayerweather | Apr. 14, 1959 |
| 2,902,332 | Bauer | Sept. 1, 1959 |

FOREIGN PATENTS

| 9,488 | Great Britain | of 1904 |
| 463,505 | Great Britain | Apr. 1, 1937 |
| 512,340 | Great Britain | Sept. 1, 1939 |
| 590,512 | Germany | Jan. 9, 1934 |